(12) United States Patent
Malcolm

(10) Patent No.: US 6,950,980 B1
(45) Date of Patent: Sep. 27, 2005

(54) SYSTEM, METHOD, AND PROGRAM PRODUCT FOR SAVING A SUBMITTED FORM OF A WEB PAGE

(75) Inventor: Jerry Walter Malcolm, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 849 days.

(21) Appl. No.: 09/583,520

(22) Filed: May 31, 2000

(51) Int. Cl.$^7$ .............................................. G06F 17/00

(52) U.S. Cl. .............................. 715/505; 715/506; 715/507

(58) Field of Search ............................... 715/505, 507, 715/508, 506; 382/305; 705/26; 704/275

(56) References Cited

U.S. PATENT DOCUMENTS

| | | | |
|---|---|---|---|
| 5,243,149 A | | 9/1993 | Comerford et al. |
| 5,301,268 A | | 4/1994 | Takeda |
| 5,404,442 A | | 4/1995 | Foster et al. |
| 5,640,577 A | * | 6/1997 | Scharmer .................... 715/507 |
| 5,787,274 A | | 7/1998 | Agrawal et al. |
| 5,794,259 A | * | 8/1998 | Kikinis ....................... 715/507 |
| 5,835,919 A | | 11/1998 | Stern et al. |
| 5,850,214 A | | 12/1998 | McNally et al. |
| 5,870,088 A | | 2/1999 | Washington et al. |
| 5,870,717 A | * | 2/1999 | Wiecha ....................... 705/26 |
| 5,963,952 A | | 10/1999 | Smith |

(Continued)

FOREIGN PATENT DOCUMENTS

WO    WO 99/10800    3/1999

OTHER PUBLICATIONS

Robert Cowart, "Mastering Windows 3.1, Special Edition," Sybex, p. 256.*

(Continued)

*Primary Examiner*—Joseph Feild
*Assistant Examiner*—James H. Blackwell
(74) *Attorney, Agent, or Firm*—Marilyn Smith Dawkins; Dillon & Yudell LLP

(57) ABSTRACT

A system, method, and program product enables saving a submitted form of a web page. A browser application receives from a user data for a form in a web page. Upon the submission of the form with the data to a server system hosting the web page, an address of the web page, the data provided from the user for the form, and at least one field identifier for associating the data to at least one respective field of the form, are saved into a volatile memory of the client. The address, the data, and the at least one field identifier remain stored in the volatile memory system after the browser application is closed. When the user opens the browser that had been closed and again requests retrieval of the web page, the browser retrieves from the server the web page that is at the address stored in the volatile memory. The browser restores the form of the web page with the data stored in the volatile memory. The browser calls a clipboard operation of an operating system on which the client system operates to save the address of the web page, the data for the form, and the one or more field identifiers, into the volatile memory. If the data for the form is successfully submitted to the server and the browser receives another request for a next web page from the user, the browser application erases, if required, the data from the volatile memory system.

21 Claims, 5 Drawing Sheets

U.S. PATENT DOCUMENTS

| | | | |
|---|---|---|---|
| 5,970,482 A | 10/1999 | Pham et al. | |
| 6,044,382 A * | 3/2000 | Martino | 715/505 |
| 6,192,380 B1 * | 2/2001 | Light et al. | 715/505 |
| 6,269,389 B1 * | 7/2001 | Ashe | 718/100 |
| 6,490,601 B1 * | 12/2002 | Markus et al. | 715/507 |
| 6,587,822 B2 * | 7/2003 | Brown et al. | 704/275 |
| 6,589,290 B1 * | 7/2003 | Maxwell et al. | 715/507 |

OTHER PUBLICATIONS

Courtner, "Mastering Microsoft Office 2000, Professional Edition", Apr. 1999, pp. 38-40.*

Aaron Skonnard, *Client Persistence*; Microsoft Internet Developer—Dec. 1999, pp. 1-10.

* cited by examiner

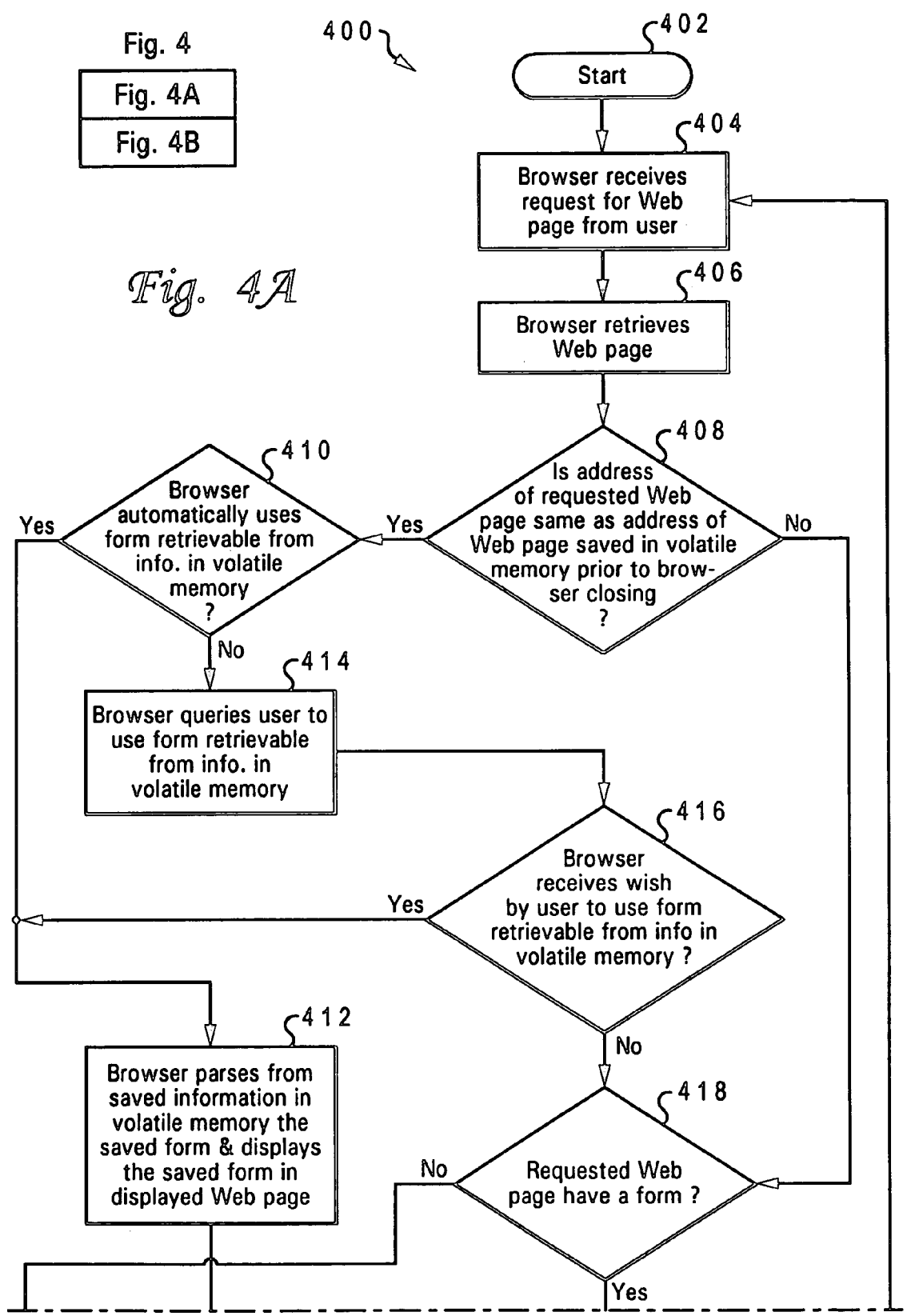

SYSTEM, METHOD, AND PROGRAM PRODUCT FOR SAVING A SUBMITTED FORM OF A WEB PAGE

BACKGROUND OF THE INVENTION

1. Technical Field

The present invention relates in general to a web browser application run on a client system that communicates with a server system to retrieve web pages, and, in particular, to the submission of a form of a web page, which is retrieved by the client system from the server system, through the web browser application. Still more particularly, the present invention relates to a system, method, and program product for saving a form for a web page, which is submitted by the client system through the web browser application to the server system.

2. Description of the Related Art

The use of the Internet or World Wide Web (WWW) for personal and business purposes continues to grow. A user typically establishes communication from his/her client system to an Internet Service Provider (ISP), and the client system then communicates with server systems through the Internet connection to retrieve web pages requested by the user.

Many web pages provided by server systems request users to fill out forms. For example, a typical form may request data from the user, such as name, address, phone number, e-mail address, and/or method of payment. These forms are especially useful in electronic business transactions in which a business hosting a web page is able to obtain important data, such as shipping information and method of payment, from the customers. These forms are also useful for organizations hosting web sites to obtain registration information or gather statistical or profile data from various users.

A "web page" is a document on the WWW and consists of an HTML file having associated files for graphics and scripts in a particular directory on a particular machine (i.e., server system), which is identifiable by a Uniform Resource Locator (URL) location. *Microsoft Press Computer Dictionary*, Third Edition, Microsoft Press, A Division of Microsoft Corporation, Redmond, Wash., Copyright 1997 at page 506. A web page is retrieved from the server system and typically displayed to the user on a display monitor at a client system. A "form" is a structured document or presentation element (i.e., a window, box, etc.) displayed on the display monitor by a data processing system in which the document or presentation element has predefined areas or fields in which a user enters or changes data. Id. at page 204. A form may be at least part of a web page. "Data" that is provided from a user is information entered or changed in the predefined areas or fields of the form by the user of the web page. "Field identifiers" are indicators in the code for identifying the fields of the form and are used to associate the data provided from the user to the respective fields of the form. For example, an address identifier associates address data provided from the user to the address field of the form.

However, the entry of these forms may be very time consuming to the users. Some web sites have safeguards that prevent forms from being submitted more than once. This safeguard sometimes leads to the user having to back out from the form entry field and re-start the entry of data into the form if the submission of the form from the client system to the server system was not successful. Various transmission problems may cause the submission of the form to be unsuccessful. Problems with the web browser application itself or the web browser application closing may also be the source of the unsuccessful submission. If any of these problems persist, then the user may have to re-enter data in the form many times before the server system accepts the form. Re-entry of information in the form wastes significant, valuable time of the user.

The present invention recognizes the need to at least minimize the amount of time consumed by the user having to re-enter and re-submit a form for a web site multiple times.

SUMMARY OF THE INVENTION

A system, method, and program product of the invention enables saving a submitted form of a web page. The browser application according to the present invention is executed in a client system and receives from a user data for a form in a web page. If the user activates a submission of the form with the data to a server system hosting the web page, an address of the web page, the data provided from the user for the form, and at least one field identifier for associating the data to at least one respective field of the form, are saved into a volatile memory system of the client system. The address, the data, and the at least one field identifier are still stored in the volatile memory system after the browser application is closed. When the user opens the browser application that had been closed and again requests retrieval of the web page, the browser application retrieves from the server system the web page that is at the address stored in the volatile memory system. The browser application restores the form of the web page with the data stored in the volatile memory system. The browser application calls a clipboard operation of an operating system on which the client system operates to save the address of the web page, the data for the form, and the one or more field identifiers, into the volatile memory system. If the data for the form is successfully submitted to the server system and the browser application receives another request for a next web page from the user, the browser application erases, if required, the data from the volatile memory system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention saves a web page form filled with data provided by a user into a volatile memory system (via an operating system clipboard operation) of a client system before submission to a server system. The present invention reduces the amount of time wasted by a user having to re-enter and re-submit a form for a web site multiple times.

Figure 1:
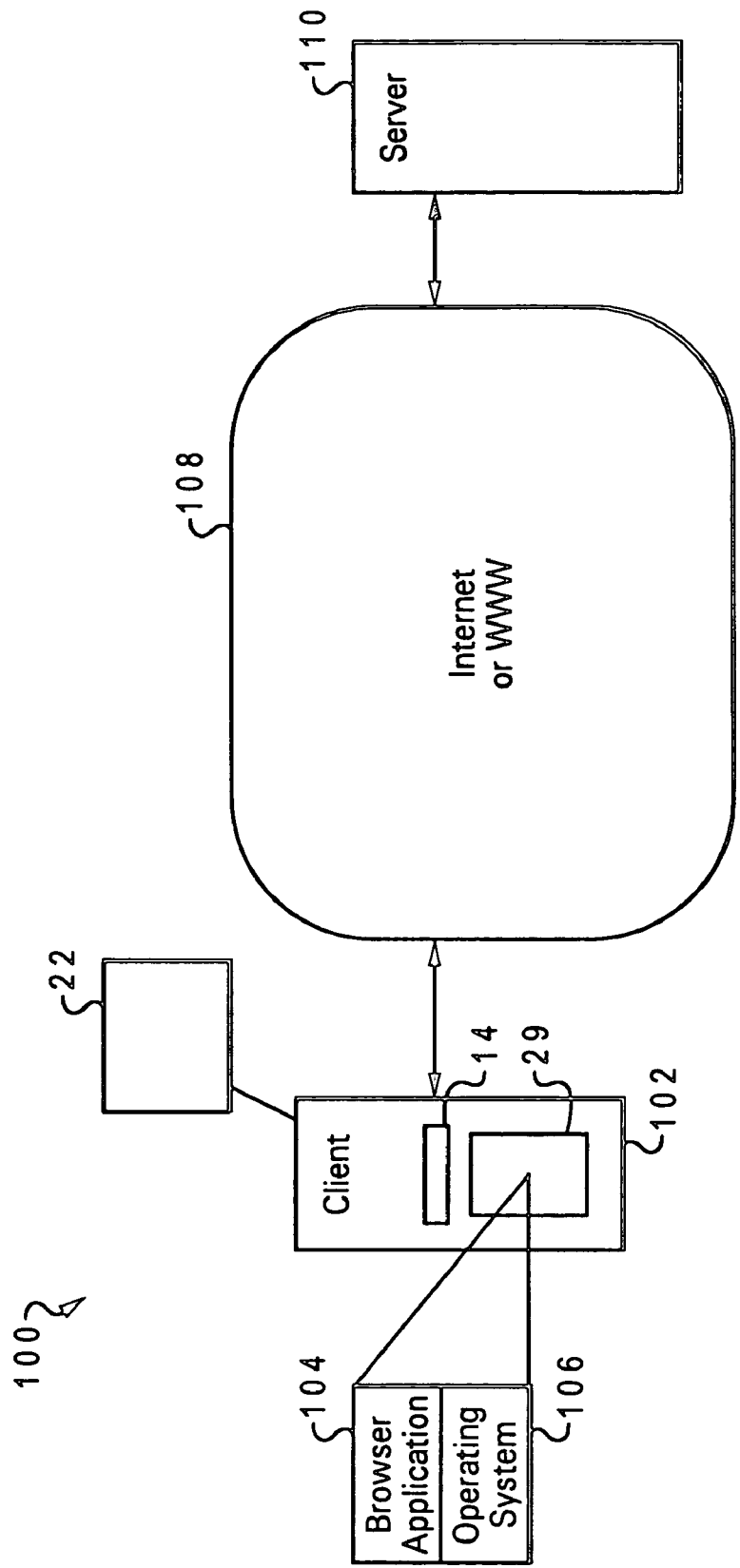
FIG. 1 is an exemplary block diagram illustrating a networked environment in which the present invention is implemented.

With reference now to FIG. 1, an exemplary block diagram 100 illustrating a networked environment in which the present invention is implemented is shown. The networked environment includes a client system 102 coupled in communication with a server system 110 through Internet or World Wide Web (WWW) 108 to permit access to web sites specified by a user of client system 102. Pages of various web sites hosted by server system 110 are retrieved and displayed on display monitor 22 by client system 102 through execution of browser application 104 on top of client operating system 106. Browser application 104 and operating system 106 are shown in FIG. 1 to be stored in hard disk drive 29 of client system 102. The web pages retrieved by client system 102 may include forms.

As stated earlier, a form may request data from the user, such as name, address, phone number, e-mail address, and/or method of payment. In accordance with the present invention, when the user fills out data for a form and submits the form with the data to server system 110 hosting the web page, browser application 104 is programmed to automatically save at least an address of the web page, the data for the form provided by the user, and the field identifiers for associating the provided data to the appropriate fields of the form into volatile memory system (i.e., Dynamic Random Access Memory (DRAM)) 14 of client system 102.

Figure 2:
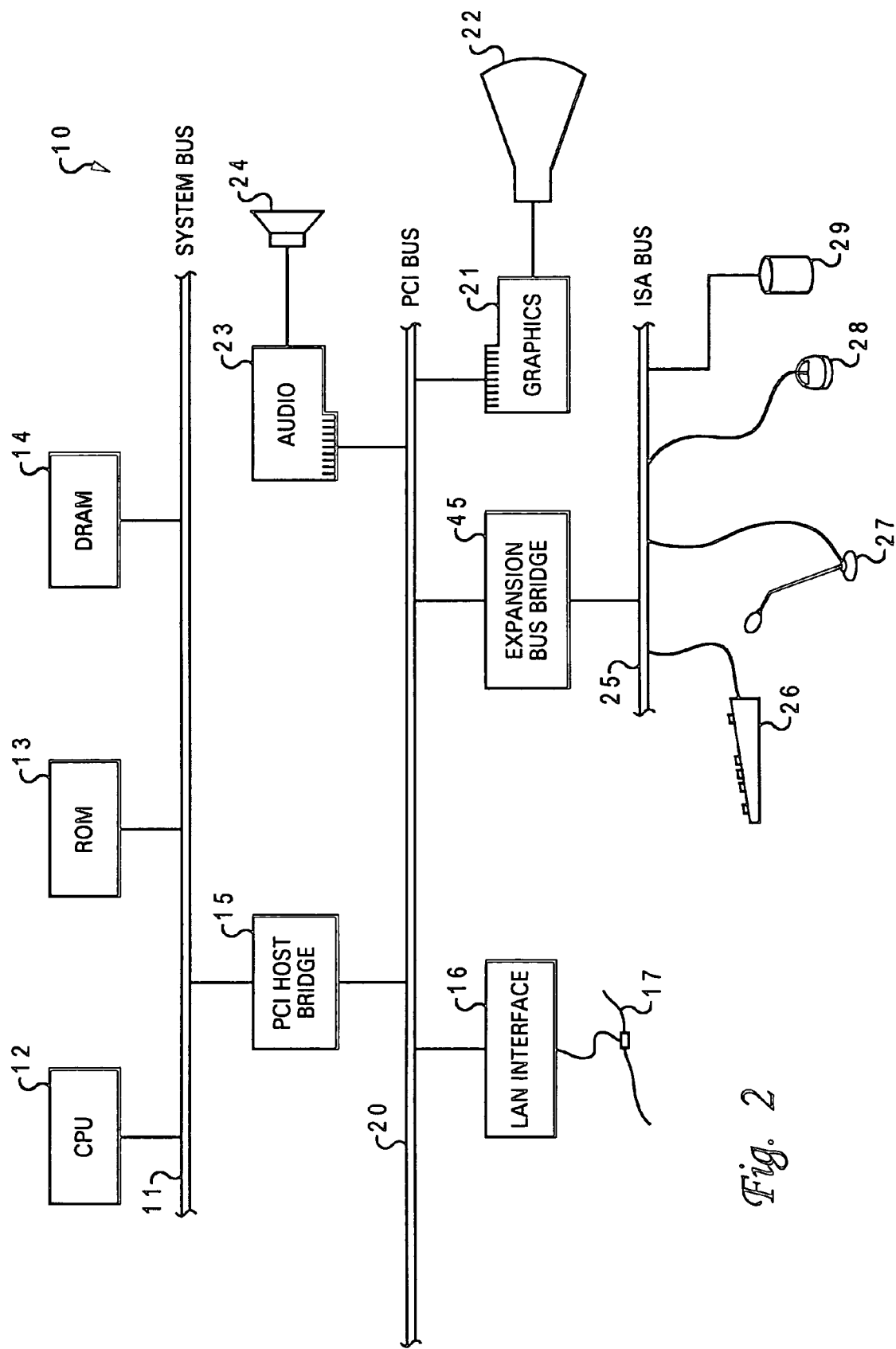
FIG. 2 is a block diagram of an exemplary embodiment of a client system or a server system that may be used for implementing the present invention.

Referring to FIG. 2, a block diagram of an exemplary computer system 10, which may be the hardware system for client system 102 or server system 110 of FIG. 1, is shown. A central processing unit (CPU) 12, read only memory (ROM) 13, and a Dynamic Random Access Memory (DRAM) 14 are connected to a system bus 11 of exemplary computer system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path allowing PCI devices to directly access DRAM 14. In addition, an audio adapter 23 may be attached to PCI local bus 20 for controlling audio output through speaker 24. A graphics adapter 21 may be attached to PCI local bus 20 for controlling visual output through display 22. Also attached to PCI local bus 20 is a local-area-network (LAN) interface adapter 16, which connects computer system 10 to a local-area network (LAN) 17. A PCI-to-ISA bus bridge, such as an expansion bus bridge 45, may be utilized for coupling an ISA bus 25 to PCI local bus 20. Although the illustrated exemplary embodiment describes a PCI local bus 20 and an ISA bus 25, the present invention is not limited to these particular bus architectures. Rather, the present invention can be utilized in any computer system having other different bus architectures. As shown, a keyboard 26, a microphone 27, a mouse 28, and a hard disk drive 29 may be attached to ISA bus 25 to perform certain basic I/O functions.

Figure 3:
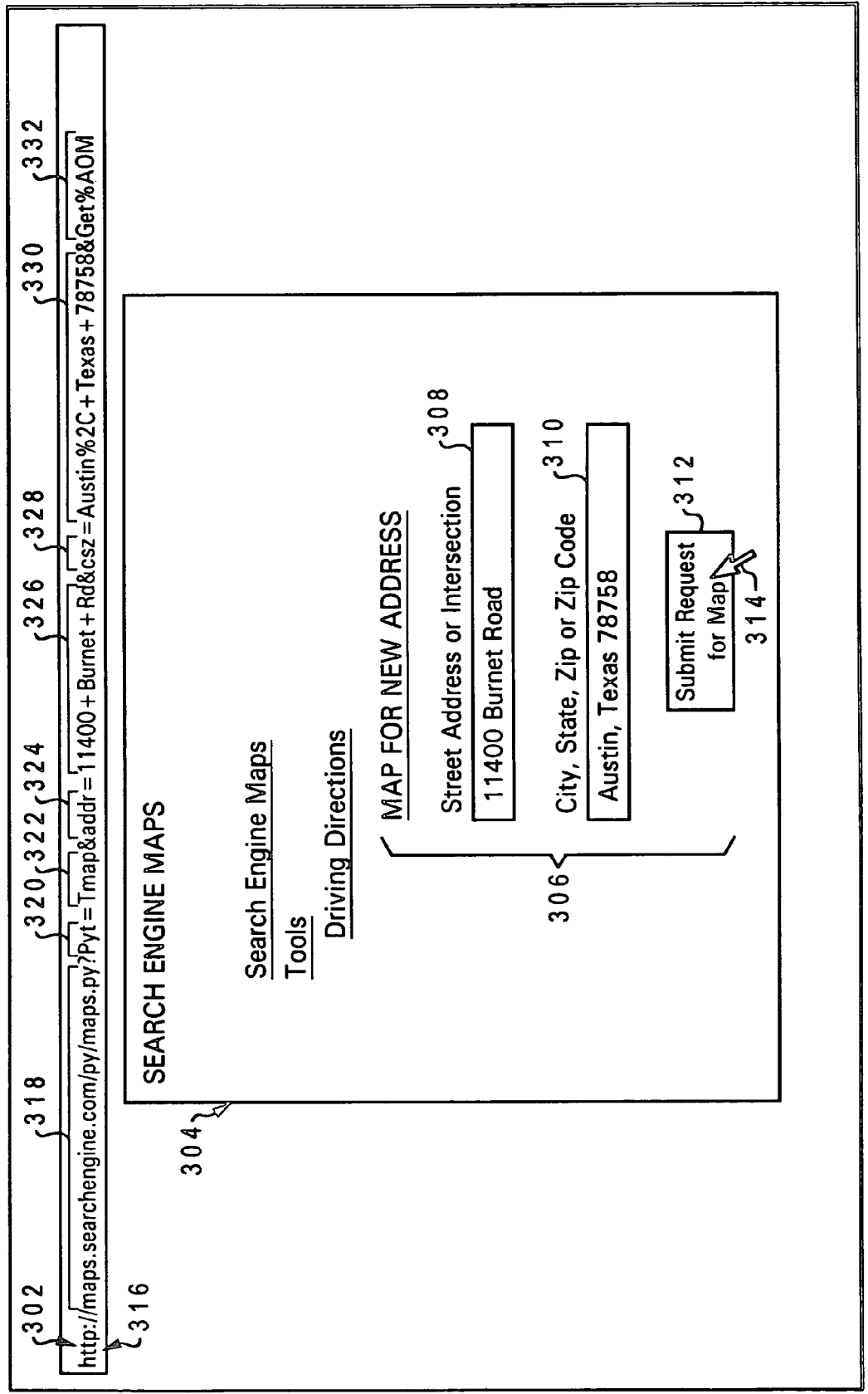
FIG. 3 is a computer display showing a web page having a form that is filled with data provided by a user and that is saved into a volatile memory system in the client system before being submitted to the server system.

With reference now to FIG. 3, a screen 300 of display 22 (in FIGS. 1 and 2) showing an exemplary web page 304 including a form 306 is shown. According to the present invention, information relating to form 306, such as web page address 318, data inputted into fields 308 and 310 by the user, and field identifiers 324 and 328 for identifying fields 308 and 310 and associating the data provided by the user to respective fields 308 and 310, is saved into a volatile memory system, such as DRAM 14 shown in FIGS. 1 and 2 of client system 102 before submission of form 306 to server system 110. Exemplary web page 304 is from a web site hosted by server system 110 in which the web site has a search engine for finding and displaying maps and driving directions. Web page 304 provides an interface to the search engine that allows the user to request the map or directions for an address. Form 306 contains street address or intersection ("address") field 308 and city, state, and zip code ("CSZ") field 310 and a form submission icon 312. The user fills in address field 308, and city, state, and zip code ("CSZ") field 310, with appropriate data.

Web page 304 is defined by any suitable code, such as hypertext markup language ("HTML" or "XML"), and the code is interpreted by browser application 104 (as shown in FIG. 1) when requested by the user to display web page 304 on screen 300 of display 22 at client system 102. In HTML, the start of form 306 is defined with a "begin-form" identifying code, such as follows: "<FORM ACTION="/PY/MAPS.PY?PYT=TMAP&YY=6735"METHOD=GET>". Address field 308 is indicated by textual input code, such as "<INPUT TYPE="TEXT" NAME=ADDR VALUE=""SIZE=35>". CSZ field 310 is defined by another textual input code, such as "<INPUT TYPE="TEXT" NAME=CSZ VALUE=""SIZE=35>". Form submission icon 312 is displayed by input code that defines a command for submitting information, such as "<INPUT TYPE=SUBMIT NAME="GET&NBSP;MAP"VALUE="GET MAP">". The end of form 306 is defined with an "end-form" identifying code, such as "</FORM>".

As shown in FIG. 3, the user inputs an address, such as "11400 Burnet Road", in address field 308 and the city, state, and zip code, such as "Austin, Tex. 78758", in CSZ field 310. The user uses a mouse 28 or other pointer control device at client system 102 to control cursor 314 on screen 300 and activate form submission icon 312. As shown in FIG. 3, form submission icon 312 is labeled "Submit Request for Map" button.

When form submission icon 312 is activated, web page identifier 316 for web page 304 having at least the address of web page 304, the user-provided data for fields 308 and 310 and field identifiers 324 and 328 (i.e., "addr" identifier and "csz" identifier) for identifying fields 308 and 310 and associating the provided data to respective fields 308 and 310, is shown in web address field 302. Web page identifier 316 is shown in FIG. 3 as the following string: "http://maps.searchengine.com/py/maps.py?Pyt=Tmap&addr=11400+Bur net+Road&csz=Austin%2C+Texas.+78758&Get%AOM".

At the time of submitting form 306 (i.e., when form submission icon 312 is activated), web page identifier 316 includes an address 318 for web page 304 (i.e., "maps-.searchengine.com/py/maps.py"), a form tag 320 (i.e., "Pyt"), a form tag definition 322 (i.e., "Tmap"), a first textual input 324 (i.e., "addr" identifier), a first textual value 326 (i.e., "11400 Burnet Road"), a second textual input 328 (i.e., City, State, and Zip Code ("csz" identifier)), a second textual value 330 (i.e., "Austin, Tex. 78758"), and a submitting input 332 (i.e., "Get % AOM").

Address 318 identifies the Uniform Resource Locator ("URL") location of web page 304. The text in web page identifier 316 following address 318 defines form 306 that has been filled-out by the user. Form tag 320 identifies that the following portion in web page identifier 316 specifies form 306. Form tag definition 322 indicates that various inputs and definitions for the inputs that follow in web page identifier 316 are being provided for form 306. First textual input 324 identifies the input for the first field of the form, which is address field 308. First textual value 326 contains the textual value for first textual input 324 (i.e., "addr" identifier), which is the actual text inputted by the user in address field 308 (i.e., "11400 Burnet Road"). Second textual value 328 contains the textual value for second textual input 330 (i.e., "csz" identifier), which is the actual text inputted by the user in CSZ field 310 (i.e., "Austin, Tex. 78758"). Submitting input 332 is defined as a "Get" command (i.e., "Get%AOM") in which client system 102 commands retrieval of appropriate information from server system 110 based on form 306 filled out by the user and submitted to server system 110. The "Get" command is executed to submit form 306 to server system 110 to search and obtain from the web site that hosts web page 304 the map or driving directions for the address (i.e., street address, city, state, and zip code) provided by the user. In the string, the "?" symbol is used as a parameter indicator for the string while the "&" symbol is used as a field separator to distinguish between separate fields in the string. Also, the "+" symbol is used to denote a space in the string, and the "%2C" symbol is used to represent a comma in the string.

Figure 4B:
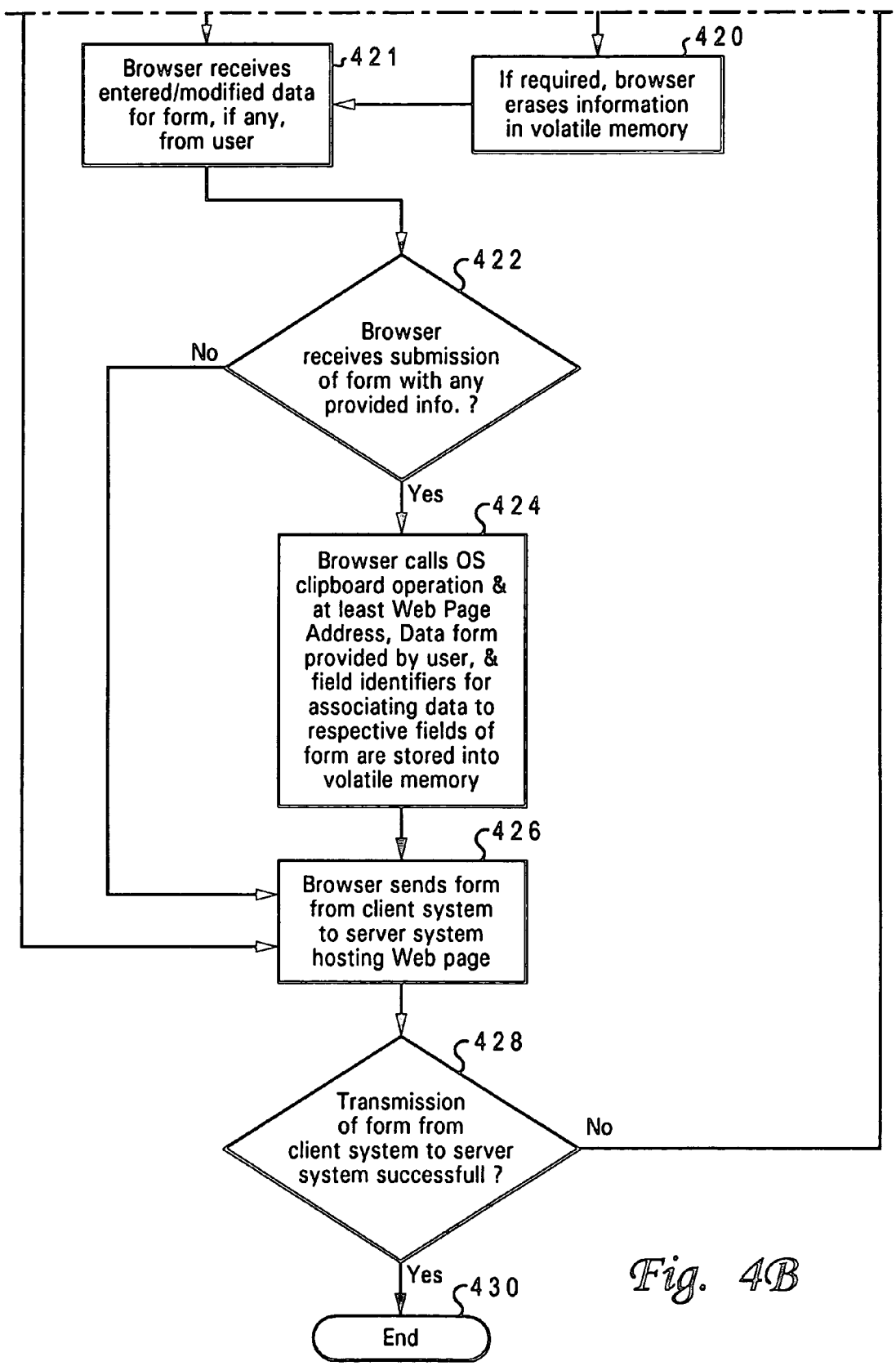
FIG. 4 is a flow chart of an exemplary method or program product for the browser application executed by the client system in accordance with the present invention.

Referring to FIG. 4, a flow chart of an exemplary method 400 or program product for browser application 104 executed by client system 102 in accordance with the present invention is shown. Method 400 or program product is preferably performed by code for browser application 104. Method 400 starts at block 402 and moves to block 404, which shows browser application 104 receiving a request for a web page, such as web page 304 or any other web page, from the user. Method 400 next proceeds to block 406, which depicts browser application 104 retrieving the requested web page from the host server system. Method 400 then moves from block 406 to decision block 408, which depicts a determination whether the address of the web page requested by the user, after opening browser application 104 that had been closed, is the same address of the web page saved in a volatile memory system (DRAM 14) via a clipboard operation of operating system 106 of client system 102.

If the address of the web page requested by the user is not the same as the address of a web page, if any, saved in the volatile memory system (DRAM 14), then method 400 moves from decision block 408 directly to decision block 418. On the other hand, if the address of the web page requested by the user is the same as the address of a web page saved in the volatile memory system, then method 400 moves from decision block 408 to decision block 410. Decision block 410 shows a determination whether browser application 104 automatically uses the form retrievable from the information stored in the volatile memory system.

If at decision block 410, browser application 104 does automatically use the form retrievable from the information stored in the volatile memory system, then method 400 moves from decision block 410 to block 412. However, if at decision block 410, browser application 104 does not automatically use the retrievable from the information stored in the volatile memory system, then method 400 moves from decision block 410 to block 414. Block 414 depicts browser application 104 querying the user as to whether he/she wishes to use the form retrievable from the information stored in the volatile memory system (e.g., saved onto the "clipboard"). The query made at block 414 provides flexibility to the user as to whether he/she desires to still use the same data previously provided for the form. Method 400 then moves from block 414 to decision block 416, which depicts a determination whether the user wishes to use the form retrievable from the information in the volatile memory system. If at decision block 416, the user does not wish to use the form retrievable from the information stored in the volatile memory system, then method 400 moves from decision block 416 directly to decision block 418. However, if at decision block 416, the user does wish to use the form retrievable from the information stored in the volatile memory system, then method 400 moves from decision block 416 to block 412. Block 412 shows browser application 104 parsing the information stored in the volatile memory system and displaying the saved data in the appropriate fields of the form within the retrieved web page. Method 400 then moves from block 412 directly to block 421.

As an exemplary implementation of blocks 404 to 416, first assume that web page identifier 316 of web page 304 is stored in the volatile memory system (e.g., saved on the "clipboard") prior to browser application 104 closing, and the user again requests web page 304 when he reopens browser application 104. Given this assumption, browser application 104 retrieves web page 304 from server system 110 at block 406. Then at decision block 408, the address of the web page requested by the user is determined to be the same as address 318 of web page 304 stored in the volatile memory system (i.e., "maps.searchengine.com/py/maps.py"). Method 400 then proceeds from decision block 408 to decision block 410. If at decision block 410, browser application 104 does not automatically use the form retrievable from the information stored in the volatile memory system, method 400 moves from decision block 410 to block 414, which shows browser application 104 querying the user as to whether he/she desires to complete the form using information previously provided by the user and saved in the volatile memory system (e.g., saved on the "clipboard"). If at decision block 416, browser application 104 receives an indication from the user that he/she does not desire to use the form retrievable from the information stored in the volatile memory system, then method 400 moves from decision block 416 directly to decision block 418. However, if at decision block 416 browser application 104 receives an indication from the user that he/she does desire to use the form retrievable from the information saved in the volatile memory system, then method 400 moves from decision block 416 to block 412.

Referring back to decision block 418, browser application 104 determines whether the web page requested by the user includes a form. If the requested web page does not contain a form, then method 400 moves directly from decision block 418 to block 426. However, if the requested web page contains a form, then method 400 moves from decision block 418 to block 420, which shows, if required, browser application 104 erasing the information in the volatile memory system. Method 400 next moves from block 420 to block 421, which shows browser application 104 receiving entered or modified data for the form, if any, from the user. Method 400 then proceeds from block 421 to decision block 422. Decision block 422 shows browser application 104 determining whether a submission of a form with any information provided from the user has been received. If at decision block 422 browser application 104 determines that a form with information provided by the user (i.e., a submittable form) was not received, then method 400 moves directly from decision block 422 to block 426. On the other hand, if at decision block 422, browser application 104 determines that a submittable form was received, then method 400 proceeds from decision block 422 to block 424. Block 424 shows browser application 104 calling a clipboard operation of client operating system 106. Web page identifier 316 for the requested web page, which includes at least the address (such as address 318) of the web page, the data provided by the user for the form (i.e., the data for form 306 are first textual value 326 and second textual value 330), field identifiers (i.e., first textual input 324 and second textual input 328) for identifying the fields (i.e., address field 308 and CSZ field 310) and for associating the data provided by the user (i.e., first textual value 326 and second textual value) to the respective fields (i.e., respective address field 308 and CSZ field 310), are saved into the volatile memory system via the clipboard operation. Method 400 then moves from block 424 to block 426.

Block 426 shows browser application 104 sending the form with the data provided by the user from client system 102 to server system 110 hosting the web page that has the form. Method 400 proceeds from block 426 to decision block 428, which shows browser application 104 determining whether transmission of the form with the data provided by the user from client system 102 to server system 110 was successful. If the transmission of the form with the data was not successful, method 400 returns from decision block 428 to block 404 and continues therefrom. However, if transmission of the form with the data was successful, then method 400 finally ends at block 430.

Therefore, if browser application 104 was not successful in submitting form 306 from client system 102 to server system 110 and the user opens browser application 104 that had been closed and again requests retrieval of a web page of which a copy is buffered in the volatile memory system (e.g., saved on the "clipboard"), then method 400 enables the form with the same information previously provided by the user to be restored from the volatile memory system and displayed on the same web page within computer screen 300. Thus, the user avoids having to re-input the information for form 306. If browser application determines that the requested form has been successfully submitted to server system 110 and browser application 104 then receives another request for a next web page from the user, all of the data related to the form saved in the volatile memory system may be programmed to be automatically erased by browser application 104; or alternatively browser application 104 may be programmed to query the user in erasing the data in the volatile memory system. Erasure of the data is particularly useful for security reasons, for the fact that the data is no longer needed, for clean-up purposes of the volatile memory system, or for other such reasons.

While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for saving a submitted form of a web page, said method comprising:

receiving, from a user by a browser application executed in a client system, data for a form in a web page; and prior to submission of the form with the data to a server system hosting the web page, the browser application automatically saving an address of the web page, the data provided from the user for the form, and at least one field identifier for associating the data to at least one respective field of the form, into a volatile memory system of the client system, wherein the address, the data and the at least one field identifier are still stored in the volatile memory system after the browser application is closed.

2. The method according to claim 1, further comprising:

in response to the user opening the browser application that had been closed and again requesting retrieval of the web page, retrieving the web page from the server system;

detecting a match between the saved address and the address of the retrieved web page, and in response to detecting a match between the saved address and the address of the retrieved web page, automatically filling in the form of the web page with the data stored in the volatile memory system.

3. The method according to claim 2, wherein automatically filling in the form of the web page with the data stored in the volatile memory system further comprises:

parsing, by the browser application, the data for the form; and displaying, by the browser application, the form with the data.

4. The method according to claim 2, wherein:

said automatically filling comprises automatically filling in the form of the web page with the data only in response to the user responding with an affirmative response to a query by the browser application regarding whether the user wishes to fill in the form with the data saved in the volatile memory system.

5. The method according to claim 1, further comprising:

determining whether the requested web page has a submittable form; and only in response to the requested web page having the submittable form, implementing, by the browser application, the receiving and saving steps.

6. The method according to claim 1, wherein saving an address of the web page and the data provided from the user for the form further comprises:

calling a clipboard operation of an operating system on which the browser application operates to save the address, the data, and the at least one field identifier into the volatile memory system.

7. The method according to claim 1, further comprising:

in response to the data for the form being successfully submitted to the server system and the browser application receiving a request for a next web page from the user, erasing the data from the volatile memory system.

8. A system for saving a submitted form of a web page, said system comprising:
- a processing unit; and
- a storage system coupled to said processing unit and storing a browser application executable by the processing unit, wherein said storage system includes a volatile memory system and wherein said browser application includes:
  - means for receiving, from a user of the system data for a form in a web page; and
  - means for automatically saving an address of the web page, the data provided from the user for the form, and at least one field identifier for associating the data to at least one respective field of the form, into the volatile memory system prior to submission of the form with the data to a server system hosting the web page, wherein the address, the data, and the at least one field identifier are still stored in the volatile memory system after the browser application is closed.

9. The system according to claim 8, further comprising:
- means for retrieving the web page from the server system in response to the user opening the browser application that had been closed and again requesting retrieval of the web page;
- means for detecting a match between the saved address and the address of the retrieved web page; and
- means, responsive to detecting a match between the saved address and the address of the retrieved web page, for automatically filling in the form of the web page with the data stored in the volatile memory system.

10. The system according to claim 9, wherein said means for automatically filling in the form of the web page with the data stored in the volatile memory system further comprises:
- means for parsing, by the browser application, the data for the form; and
- means for displaying, by the browser application, the form with the data.

11. The system according to claim 8, wherein:
- said system further comprises means for querying, by the browser application, whether the user wishes to fill in the form using the data saved in the volatile memory system in response to a match between the address of the requested web page and the address stored in the volatile memory system; and
- said means for automatically filling comprises means for automatically filling said form only in response to the browser application receiving an indication that the user wishes to fill in the form with the data saved in the volatile memory system.

12. The system according to claim 8, further comprising:
- means for determining whether the requested web page has a submittable form; and
- means for implementing, by the browser application, the receiving and saving steps only in response to the requested web page having the submittable form.

13. The system according to claim 8, wherein said means for saving an address of the web page and the data provided from the user for the form further comprises:
- means for calling a clipboard operation of an operating system on which the browser application operates to save the address, the data, and the at least one field identifier into the volatile memory system.

14. The system according to claim 8, further comprising:
- means for erasing the data from the volatile memory system in response to the data for the form being successfully submitted to the server system and the browser application receiving a request for a next web page from the user.

15. A program product for saving a submitted form of a web page, said program product comprising:
- instruction means for receiving, from a user by a browser application executed in a client system data for a form in a web page;
- instruction means for automatically saving an address of the web page, the data provided from the user for the form, and at least one field identifier for associating the data to at least one respective field of the form, into a volatile memory system of the client system prior to submission of the form with the data to a server system hosting the web page, wherein the address, the data, and the at least one field identifier are still stored in the volatile memory system after the browser application is closed; and
- computer usable media bearing said instruction means for receiving and said instruction means for saving.

16. The program product according to claim 15, further comprising:
- instruction means for retrieving the web page from the server system in response to the user opening the browser application that had been clo sed and again requesting retrieval of the web page;
- instruction means for detecting a match between the saved address and the address of the retrieved web page, and
- instruction means, responsive to detecting a match between the saved address and the address of the retrieved web page, for automatically fill in the form of the web page with the data stored in the volatile memory system.

17. The program product according to claim 16, wherein said instruction means for automatically filling in the form of the web page with the data stored in the volatile memory system further comprises:
- instruction means for parsing, by the browser application, the data for the form; and
- instruction means for displaying, by the browser application, the form with the data.

18. The program product according to claim 15, wherein:
- said program product further comprises instruction means for querying, by the browser application, whether the user wishes to fill in the form using the data saved in the volatile memory system in response to a match between the address of the requested web page and the address stored in the volatile memory system; and
- said instruction means for filling comprises instruction means for filling said form with the saved data only in response to the browser application receiving an indication that the user wishes to fill in the form with the data saved in the volatile memory system.

19. The program product according to claim 18, further comprising:
- instruction means for determining whether the requested web page has a submittable form; and
- instruction means for implementing, by the browser application, the receiving and saving steps only in response to the requested web page having the submittable form.

20. The program product according to claim 15, wherein said instruction means for saving an address of the web page and the data provided from the user for the form further comprises:
- instruction means for calling a clipboard operation an operating system on which the browser application operates to save the address, the data, and the at least one field identifier into the volatile memory system.

21. The program product according to claim 15, further comprising:

instruction means for erasing the data from the volatile memory system in response to the data for the form being successfully submitted to the server system and the browser application receiving another request for a next web page from the user.

* * * * *

UNITED STATES PATENT AND TRADEMARK OFFICE
CERTIFICATE OF CORRECTION

| | | |
|---|---|---|
| PATENT NO. | : 6,950,980 B1 | Page 1 of 1 |
| APPLICATION NO. | : 09/583520 | |
| DATED | : September 27, 2005 | |
| INVENTOR(S) | : Jerry W. Malcolm | |

It is certified that error appears in the above-identified patent and that said Letters Patent is hereby corrected as shown below:

On the title page item (57), line 12, delete "dosed" and insert --closed--.

Claim 16, at column 10, line 25, delete "clo sed" and insert --closed--.

Claim 17, at column 10, line 31, delete "fill" and insert --filling--.

Signed and Sealed this

Twenty-ninth Day of May, 2007

JON W. DUDAS
*Director of the United States Patent and Trademark Office*